United States Patent [19]

Buthe et al.

[11] 4,411,636

[45] Oct. 25, 1983

[54] PROTECTIVE DEVICE FOR A UNIVERSAL JOINT ASSEMBLY

[75] Inventors: Theo Buthe, Lohmar; Felix Mikeska, Siegburg, both of Fed. Rep. of Germany

[73] Assignee: Jean Walterscheid GmbH, Lohmar, Fed. Rep. of Germany

[21] Appl. No.: 281,643

[22] Filed: Jul. 9, 1981

[30] Foreign Application Priority Data

Jul. 10, 1980 [DE] Fed. Rep. of Germany ....... 3026135

[51] Int. Cl.$^3$ .............................................. F16P 1/00
[52] U.S. Cl. ..................................... 464/172; 464/175
[58] Field of Search ............... 464/172, 173, 175, 170; 277/212 FB

[56] References Cited

U.S. PATENT DOCUMENTS

| | | | |
|---|---|---|---|
| 3,703,089 | 11/1972 | Geisthoff et al. ................ | 464/175 X |
| 3,830,083 | 8/1974 | Hadick et al. ............ | 277/212 FB X |
| 4,107,952 | 8/1978 | Geisthoff ............................. | 464/175 |
| 4,338,797 | 7/1982 | Herchenbach .................. | 464/172 X |

Primary Examiner—Stuart S. Levy
Assistant Examiner—Daniel P. Stodola
Attorney, Agent, or Firm—Toren, McGeady and Stanger

[57] ABSTRACT

A universal joint assembly connecting a pair of shaft ends is provided with a protective boot having a bellows-like configuration defining circumferential folds and including a conical connecting portion. A connecting piece is provided for joining a protective tube of one of the shafts with the protective boot. The connecting piece includes a funnel-like extension partially projecting into the conical connecting portion of the protective boot and a rigid supporting ring engages about the protective boot. The supporting ring includes a conical part adapted to extend in embracing engagement over the conical connecting portion of the protective boot, the conical part extending to partially overlap with a funnel-like extension of the connecting piece. The supporting ring is formed with a bead which is directed radially inwardly into engagement with one of the folds of the protective boot, the bead being formed on one side with a conical surface to facilitate insertion of the boot into the supporting ring and on the opposite side with a hook-like shape for maintaining engagement within the fold.

1 Claim, 1 Drawing Figure

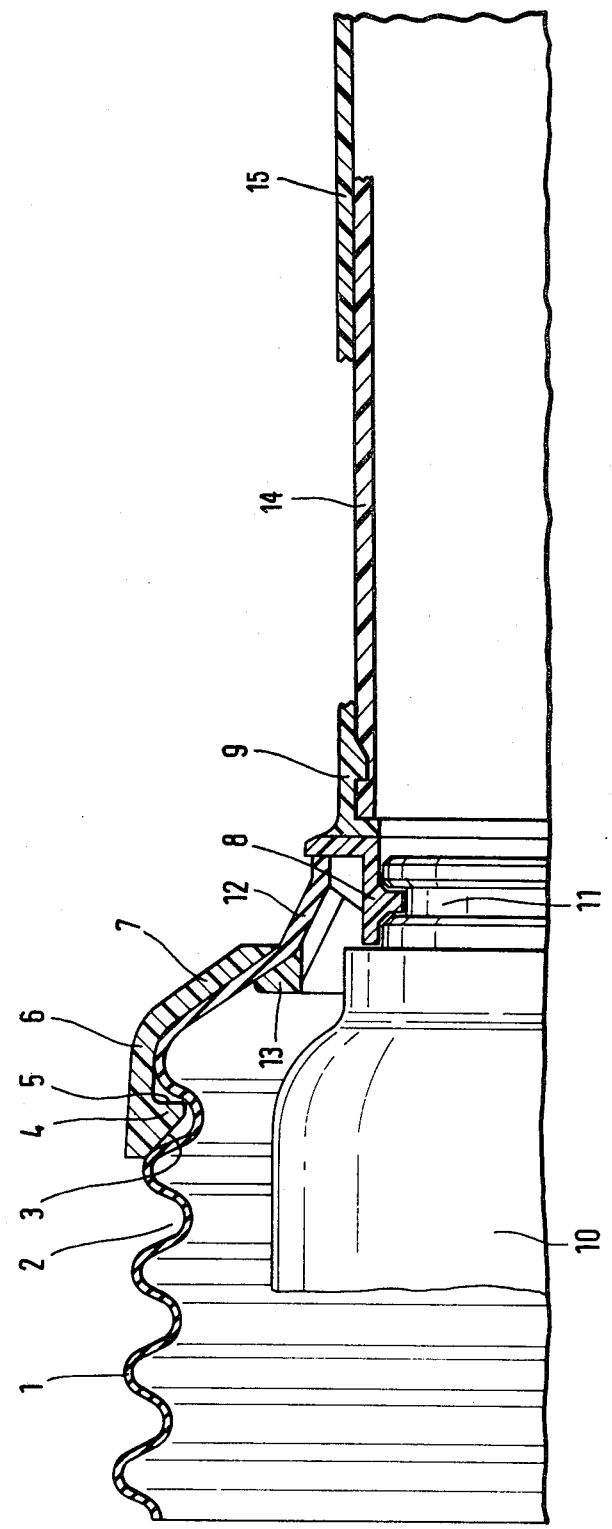

PROTECTIVE DEVICE FOR A UNIVERSAL JOINT ASSEMBLY

The present invention relates generally to a protective device particularly for a universal joint between the ends of a pair of shafts which may constitute a drive shaft assembly connecting a tractor with an agricultural implement.

More particularly, the invention relates to the type of assembly wherein a pair of telescopic protective tubes surround the shafts of the drive shaft assembly, with each of the protective tubes having an annular bearing member arranged at a respective end of at least one of the shafts which engages into an annular groove of a shank of the universal joint assembly, which may be a joint fork shank of the joint. A connecting piece is provided with through-holes for locking tongues provided for the bearing member and pointing radially outwardly and by means of which the respective protective tube is connected to a protective boot having a bellows-like configuration covering the joint. The connecting piece is provided with a funnel-like extension partially projecting into the protective boot and with a supporting ring arranged at the protective boot.

Protective guard assemblies for a universal joint are known from the prior art, particularly U.S. Pat. No. 4,107,952. Such a protective guard assemblies comprise two protective boots which serve to cover a wide-angle universal joint and which have open ends facing each other. The boots are held with respect to each other by a supporting ring extending across both of the protective boots.

However, disadvantages arise in this type of guard assembly in that the support described does not provide support against radial forces occurring in the area of the joint. Therefore, if the device is handled incorrectly, the protective assembly may be damaged.

The present invention is directed toward provision of a protective device which will provide effective protection without affecting the angle of articulation of the joint even if the device is handled carelessly. The invention is also directed toward a device which is capable of remaining functional even when subjected to high radial and axial loads.

SUMMARY OF THE INVENTION

Briefly, the present invention may be described as a protective device for a universal joint assembly between two shafts wherein there is provided a pair of telescopic protective tubes (14, 15) surrounding at least one of the shafts, one of the tubes having an annular bearing member at a respective end of said at least one shaft which engages into an annular groove of a shank of the joint assembly, the protective device comprising a protective boot having a bellows-like configuration defining circumferential folds and including a conical connecting portion, a connecting piece having said bearing member connected thereto by means of which a respective protective tube is connected with said protective boot, said connecting piece including a funnel-like extension partially projecting into said conical connecting portion of said protective boot, a rigid supporting ring engaging about said protective boot and including a conical part adapted to extend in embracing engagement over said conical connecting portion of said protective boot, said conical part extending to partially overlap said funnel-like extension, and a bead directed radially inwardly extending from said supporting ring into engagement within one of said folds of said protective boot, said bead being formed on one side thereof with a conical surface to facilitate insertion of said protective boot into said supporting ring and on the opposite side thereof with a hook-like shape for maintaining engagement within said fold.

An important advantage of the protective device in accordance with the invention is that the supporting ring may be fitted without the use of tools.

Since the supporting ring and the funnel-like extension of the connecting piece partially overlap, the supporting ring is capable of withstanding high radial forces. If axial forces occur, the supporting ring is in a position of escaping elastically in the direction of the protective tube. Therefore, even if the protective device is handled incorrectly, it is unlikely that damage will occur.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DESCRIPTION OF THE DRAWING

The single figure of drawing is a partial cross-sectional view depicting a protective device in accordance with the present invention.

DETAILED DESCRIPTION OF THE PREFERRED EMBODIMENT

Referring now to the drawing, there is shown a protective device for a universal joint assembly connecting the ends of a pair of shafts, the device being particularly suitable for use in a drive shaft assembly connecting a tractor with an agricultural implement. A protective boot 1 is arranged to extend over a connecting piece 9 by means of a connecting cone 12. The connecting piece 9 also supports a bearing ring 8 which, for the purpose of supporting the protective device, engages into an annular groove 11 of a shank of a part of the universal joint assembly; in the drawing, the part shown being a joint fork 10.

In order to connect the supporting ring 6 to the protective device, the supporting ring 6 is slipped onto the protective boot 1 toward its open end from the side of the protective tube.

The supporting ring 6 is formed with a conical part 7 and with an inwardly radially extending bead 4. The radially inwardly extending bead 4 has on one side thereof a conical surface 3 and on the opposite side thereof a hook-like part 5.

Since the radially inwardly extending bead 4 of the supporting ring 6 is provided with the conical surface 3, facing toward the mounting direction of the ring 6 onto the boot 1, the supporting ring 6 may be slipped over the protective boot 1 quite easily without requiring the use of tools. In order to hold the supporting ring 6 more firmly when subjected to axial forces, the bead 4 is provided with the hook-like part 5 on the side thereof opposite the conical surface 3 which side faces the connecting piece 9 so that the bead 4 will grip firmly into a fold 2 of the protective boot 1 and thereby maintain its engagement within the fold.

A funnel-shaped extension 13 is provided projecting into the connecting conical part 12 of the boot 1 with the extension 13 being partially overlapped by the conical part 7 of the supporting ring 6 so that the supporting ring is sufficiently supported against radial loads.

While a specific embodiment of the invention has been shown and described in detail to illustrate the application of the inventive principles, it will be understood that the invention may be embodied otherwise without departing from such principles.

What is claimed is:

1. A protective device for a universal joint assembly between two shafts connecting an agricultural implement with a tractor, including a pair of telescopic protective tubes surrounding at least one of said shafts, one of said tubes having an annular bearing member at a respective end of said at least one shaft which engages into an annular groove of a shank of said joint assembly, said protective device comprising, in combination, a protective boot having a bellows-like configuration defining circumferential folds and including a conical connecting portion, a connecting piece having said bearing member connected thereto by means of which a respective protective tube is connected with said protective boot, said connecting piece including a funnel-like extension partially projecting into said conical connecting portion of said protective boot, a rigid supporting ring engaging about said protective boot and including a conical part adapted to extend in embracing engagement over said conical connecting portion of said protective boot, said conical part extending to partially overlap said funnel-like extension, and a bead directed radially inwardly extending from said supporting ring into engagement within one of said folds of said protective boot, said bead being formed on one side thereof with a conical surface to facilitate insertion of said protective boot into said supporting ring and on the opposite side thereof with a hook-like shape for maintaining engagement within said fold.

* * * * *